US011879091B2

(12) United States Patent
Abdelfatah et al.

(10) Patent No.: US 11,879,091 B2
(45) Date of Patent: Jan. 23, 2024

(54) RESERVOIR EMPLACEMENT OF RHEOLOGICALLY TUNED AND TIMED NANOPARTICLE EMULSIONS

(71) Applicant: UTI Limited Partnership, Calgary (CA)

(72) Inventors: Elsayed Abdelfatah, Calgary (CA); Steven Bryant, Calgary (CA)

(73) Assignee: UTI Limited Partnership

( * ) Notice: Subject to any disclaimer, the term of this patent is extended or adjusted under 35 U.S.C. 154(b) by 0 days.

(21) Appl. No.: 17/160,757

(22) Filed: Jan. 28, 2021

(65) Prior Publication Data
US 2021/0230470 A1 Jul. 29, 2021

Related U.S. Application Data

(60) Provisional application No. 62/966,956, filed on Jan. 28, 2020.

(51) Int. Cl.
| C09K 8/516 | (2006.01) |
| C09K 8/60 | (2006.01) |
| C09K 8/80 | (2006.01) |
| C09K 8/84 | (2006.01) |
| B82Y 40/00 | (2011.01) |
| B82Y 30/00 | (2011.01) |

(52) U.S. Cl.
CPC .............. *C09K 8/516* (2013.01); *C09K 8/602* (2013.01); *C09K 8/845* (2013.01); *B82Y 30/00* (2013.01); *B82Y 40/00* (2013.01)

(58) Field of Classification Search
None
See application file for complete search history.

(56) References Cited

U.S. PATENT DOCUMENTS 3,741,307 A 6/1973 Sandiford et al.
5,351,757 A 10/1994 Chou et al.
(Continued)

FOREIGN PATENT DOCUMENTS

WO WO-2013057446 A1 * 4/2013 ............. B01J 27/04

OTHER PUBLICATIONS

Demikhova, I. I., Likhanova, N. V., Moctezuma, A. E., Hernandez Perez, J. R., Olivares-Xometl, O.., and I. V. Lijanova. "Improved Oil Recovery Potential by Using Emulsion Flooding." SPE Russian Oil and Gas Exploration & Production Technical Conference and Exhibition, Moscow, Russia, Oct. 2014 (Year: 2014).*
(Continued)

*Primary Examiner* — Charles R Nold
(74) *Attorney, Agent, or Firm* — Harness, Dickey & Pierce, P.L.C.

(57) ABSTRACT

Methods are disclosed for emplacing a gel-form material in a porous subterranean formation, such as a hydrocarbon reservoir. The material is formed by admixing solid nanoparticles with gelation supporting amounts of surfactants or ionic species, such as ionic species of the kind that form ionic liquids. The nanoparticle to ion ratio may be selected, in combination with selecting the components of the gel-form material, so that the rheological and gelation properties of the gel-form material are adapted for a particular use, for example forming a fluid flow barrier in a reservoir.

18 Claims, 14 Drawing Sheets

(56) References Cited

U.S. PATENT DOCUMENTS

Figure 1:
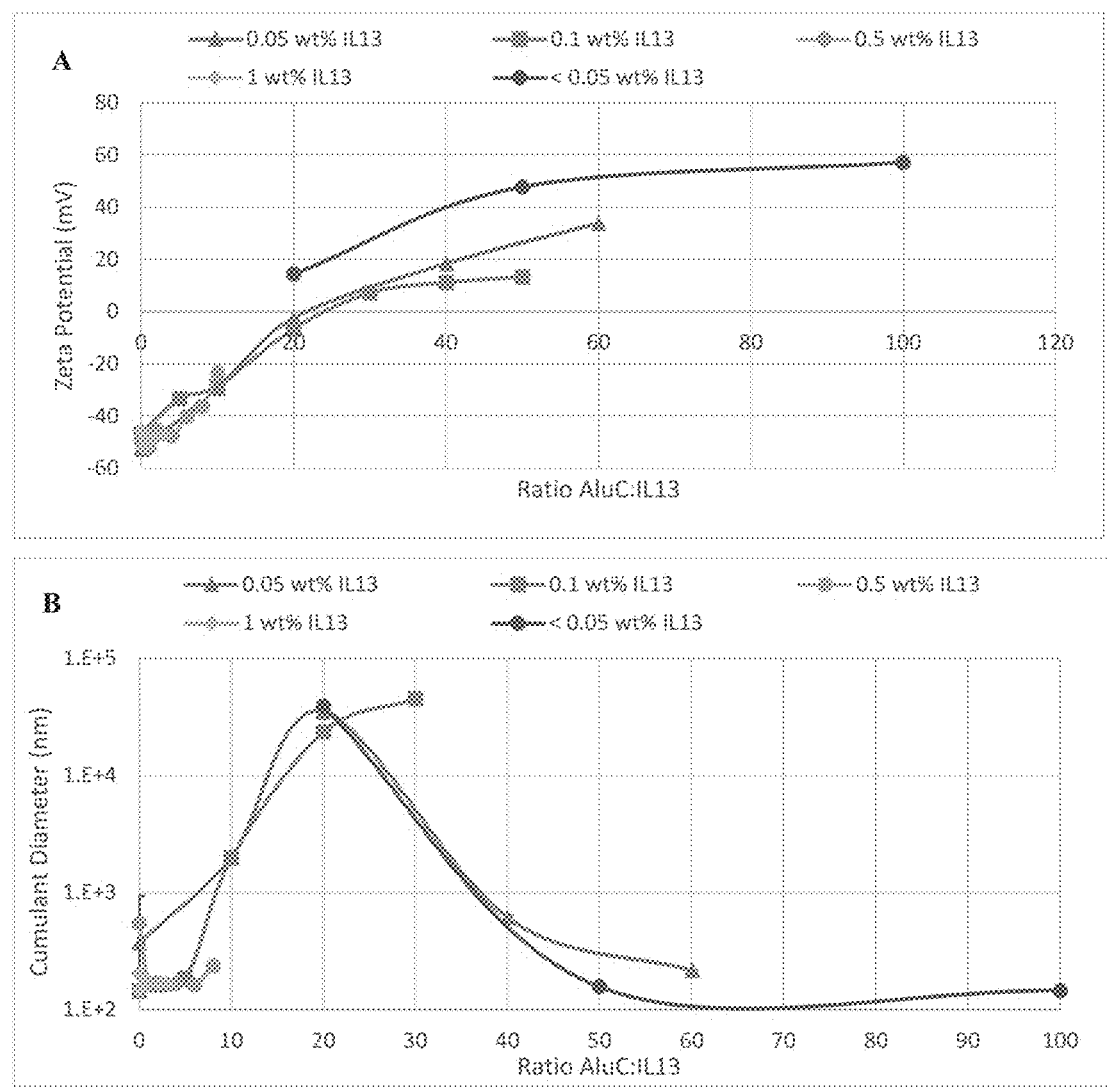

2017/0009172 A1* 1/2017 Bender .................. C07C 211/63
2018/0340129 A1* 11/2018 Wang .................. C10M 105/62

OTHER PUBLICATIONS

I. Rodriguez-Escontrela, "Correlation of three-liquid-phase equilibria involving ionic liquids," PCCP, vol. 18, pp. 21610-21617, 2016.
Bergna, The Colloid Chemistry of Silica, Advances in Chemistry: An Overview, American Chemical Society : Washington, DC, pp. 1-47, 1994.
H. B. A. Bera, "Ionic liquids as alternatives of surfactants in enhanced oil recovery—A state-of-the-art review," Journal of Molecular Liquids, pp. 178-186, 2016).
I. G. Amin Sharifi Haddad, "CO2-based heavy oil recovery processes for post-CHOPS reservoirs," Journal of CO2 Utilization, vol. 19, pp. 238-246, 2017.
McCrary et al., New J. Chem., 2013, 37, 2196.

* cited by examiner

A

B

C

D

A

B

C

D

A

B

C

D

A

B

C

D

RESERVOIR EMPLACEMENT OF RHEOLOGICALLY TUNED AND TIMED NANOPARTICLE EMULSIONS

CROSS-REFERENCE TO RELATED APPLICATIONS

This application claims the benefit of U.S. Provisional Application No. 62/966,956, filed on Jan. 28, 2020. The entire disclosure of the above application is incorporated herein by reference.

FIELD

Innovations are disclosed in the field of chemical engineering, related to the use of dispersions of solid nanoparticles decorated with ionic species in emulsions that have tuned gelation properties when emplaced in porous media.

BACKGROUND

This section provides background information related to the present disclosure which is not necessarily prior art.

In the context of various enhanced oil recovery (EOR) techniques, a very wide variety of in situ fluid flow control systems have been used, for example, to improve conformance, including systems that make use of a wide variety of polymers, gels, foams and resins. For example, U.S. Pat. No. 5,351,757 describes methods for silica gel emplacement for EOR that involve injecting a silicate solution with a gas and an inorganic acid, so as to form a controlled amount of a silicate gel. Similarly, U.S. Pat. No. 3,741,307 discloses methods of controlling the gelation time of a silica gel comprising sodium silicate and a weak acid, by adjusting the pH.

Ionic liquids (ILs) have also been described as being useful in EOR, for example as alternatives to conventional surfactants (see H. B. A. Bera, "Ionic liquids as alternatives of surfactants in enhanced oil recovery—A state-of-the-art review," Journal of Molecular Liquids, pp. 178-186, 2016). For example, surface-active ionic liquids (SAI Ls) have been proposed for use to decrease the interfacial tension (IFT) between oil and water phases or for altering the wettability of reservoir rock. In very general terms, ILs are a mixture of an acid and a base that together to form an asymmetric salt of melting point less than 100° C. ILs can for example be diluted in various solvents for use in a very wide variety of applications.

SUMMARY

This section provides a general summary of the disclosure, and is not a comprehensive disclosure of its full scope or all of its features.

Various aspects of the present innovations relate to the discovery that ions that are members of an ionic liquid pair, i.e. are capable of forming, on their own, an ionic liquid, can be used to tailor the gelation time of gel-form materials made from solid nanoparticles. Methods are accordingly provided for emplacing a gel-form material, such as a colloidal gel-form material, in a porous subterranean formation. The material is formed by admixing solid nanoparticles with gelation supporting amounts of an anionic species and a cationic species in an aqueous media to provide a particle-loaded aqueous media. This may for example take the form of a hydrosol, i.e. a stable dispersion of solid colloidal particles in an aqueous liquid. The particle-loaded aqueous media may be colloidally stable, in the sense that the particles do not aggregate in the stable dispersion under typical conditions of use and/or storage. The particle-loaded aqueous media is characterized by a nanoparticle:ion ratio. The anionic and cationic species are members of an ionic liquid species pair, i.e. are capable of forming an ionic liquid under appropriate conditions. The selection of the ionic species, and of the nanoparticle, dictates the rheological properties of the gel-form material, so that the gel-form material may in effect be rheologically 'tuned' by the selection of these components.

The particle-loaded aqueous media is admixing with an organic solvent, so as to produce an initial emulsion having a liquid-like state. This initial emulsion may also be stable, in the sense that the emulsion does not separate into phases under typical conditions of use and/or storage.

The initial emulsion may be emplaced in a porous subterranean formation in the liquid-like state to form an emplaced emulsion, where the emplaced emulsion undergoes a transition to a gel-like state in situ in the subterranean formation. This transition results in the gel-form material, in a process analogous to gelation, so that the material becomes viscous and develops rigidity and fills the bulk of the volume originally occupied by the initial emulsion. The gel-form material may for example be characterized as having a storage G' modulus greater than its loss modulus G".

Methods are accordingly provided of emplacing a gel-form material in a porous subterranean formation, including: admixing solid nanoparticles with gelation supporting amounts of an ionic surfactant, and/or an anionic species and a cationic species in an aqueous media to provide a particle-loaded aqueous media having a nanoparticle:ion ratio, where the anionic and cationic species are members of an ionic liquid species pair. The method may also include admixing an organic solvent with the particle-loaded aqueous media so as to produce an initial emulsion having a liquid-like state. The initial emulsion may be emplaced in the porous subterranean formation in the liquid-like state to form an emplaced emulsion, where the emplaced emulsion undergoes a transition to a gel-like state in situ in the subterranean formation, to form the gel-form material. The nanoparticle:ion ratio may accordingly be selected so as to determine a gelation time during which the emplaced emulsion transitions from the liquid-like state to the gel-like state.

Alternative embodiments may include one or more of the following features. The method where the nanoparticle:ion ratio is a weight ratio of the combined anionic and cationic species to the nanoparticles in the particle-loaded aqueous media, and the ratio ranges from 1:500 to 500:1. The method where the nanoparticles are present in the particle-loaded aqueous media in an amount ranging from 0.001 wt. % to 20 wt. %. The method where the absolute concentration of nanoparticles in the gel-form material is 0.1 wt. % to 20 wt. %. The method where the subterranean formation includes a hydrocarbon reservoir. The method where the subterranean formation has a porosity of from about 0.1% to 50% The method where the formation has a permeability of from about 1 to about 50000 millidarcys. The method where the gel-form material forms a fluid flow barrier in the porous subterranean formation. The method where the storage G' modulus of the gel-form material is greater than the loss modulus G" of the gel-form material. The method where the ionic liquid species pair, together in isolation, form an ionic liquid at a temperature below 200° C. The method where the ionic liquid is tetra-N-butylammonium oleate ([N4444] [oleate]), tetra-N-butylammonium dodecylbenzene sulfonate ([N4444][DBS]), butylammonium oleate ([C$_4$NH$_3$][oleate]), N-octylammonium oleate ([C$_8$NH$_3$][Oleate]), tri-ethylammonium oleate ([HN$_{222}$][oleate]), tri-N-butylammonium oleate ([HN$_{444}$][oleate]), tri-N-octylammonium oleate ([HN$_{888}$][oleate]), N-octylammonium dodecylbenzenesulfonate ([C$_8$NH$_3$][DBS]), butylammonium dodecyl benzenesulfonate, tri-ethylammonium dodecyl benzenesulfonate, tri-N-butylammonium dodecyl benzenesulfonate, or tri-N-octylammonium dodecyl benzenesulfonate. The method where the ionic surfactant is tetra-N-butylammonium oleate ([N4444][oleate]), tetra-N-butylammonium dodecylbenzene sulfonate ([N4444][DBS]), butylammonium oleate ([C$_4$NH$_3$][oleate]), N-octylammonium oleate ([C$_8$NH$_3$][Oleate]), tri-ethylammonium oleate ([H N$_{222}$][oleate]), tri-N-butylammonium oleate ([H N$_{444}$][oleate]), tri-N-octylammonium oleate ([HN$_{888}$][oleate]), N-octylammonium dodecylbenzenesulfonate ([C$_8$NH$_3$][DBS]), butylammonium dodecyl benzenesulfonate, tri-ethylammonium dodecyl benzenesulfonate, tri-N-butylammonium dodecyl benzenesulfonate, or tri-N-octylammonium dodecyl benzenesulfonate. The method where the ionic liquid species pair includes a primary, secondary, tertiary or cyclic amine. The method where the ionic liquid species pair includes a primary, secondary or tertiary alkyl amine. The method where the ionic liquid species pair includes one or more primary carboxylic acid or sulfonic acid, saturated or unsaturated, alkyl sulfonic acid or primary, saturated or unsaturated alkyl benzene sulfonic acid. The method where the organic solvent has a dielectric constant of less than The method where the particle-loaded aqueous media is colloidally stable under stabilized conditions that include an average or maximum gravitational force during the stabilized period of 1 gravity and an ambient temperature or a temperature above a freezing point and/or below a boiling point of the media. The method where the nanoparticles are included substantially of a metal or a metal oxide. The method where the metal or metal oxide includes silicon oxide, iron oxide or aluminum oxide. The method where the nanoparticles have an average dimension ranging from 1 nm to 500 nm. The method where the particle-loaded aqueous media forms a hydrosol. The method where the particle-loaded aqueous media is colloidally stable.

Methods are further provided for reducing the porosity or permeability of a subterranean formation, involving injecting a Pickering emulsion into the subterranean formation, where the emulsion develops into a gel over a gelling time after injection. The gel may form a seal in the formation, and the seal may provide a barrier to an aqueous fluid flow in the formation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 includes to line graphs illustrating: (A) Zeta Potential and (B) Cumulant Diameter of samples composed of IL13 and Alu C nanoparticles FIG. 2 includes to plots showing a comparison of measured parameters of (A) Cumulant Diameter and (B) Zeta Potential, of samples consisting of Ratio 0, 10 and 50 of Surfactant 13 with Alu C.

Figure 3:
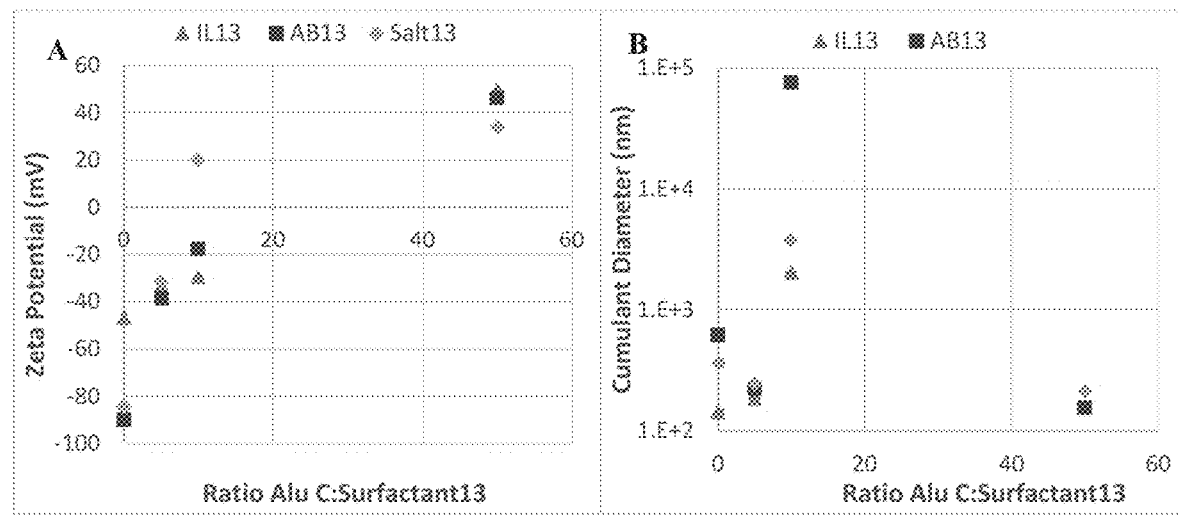

FIG. 3 includes to plots showing a comparison of measured parameters of (A) Zeta Potential and (B) Cumulant Diameter of samples consisting of Ratio 0, 10 and 50 of Surfactant 13 with Alu C.

Figure 4:
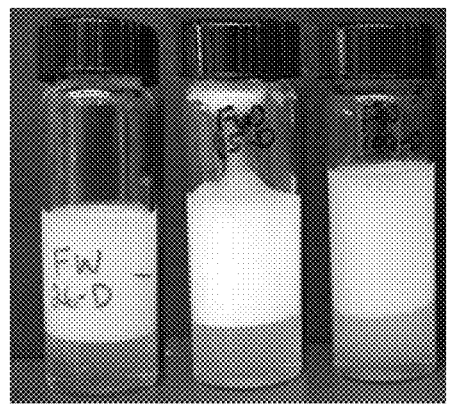
Figure 4:
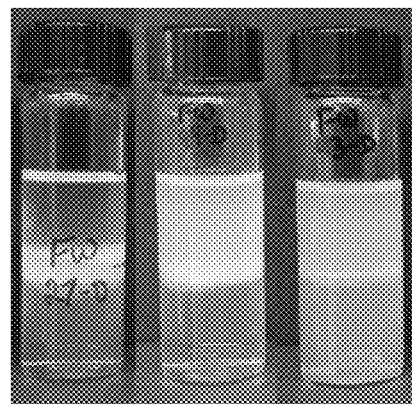
Figure 4:
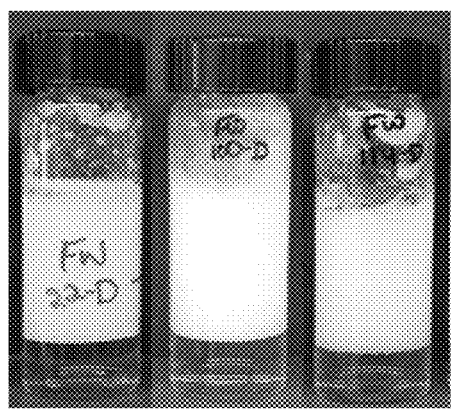
Figure 4:
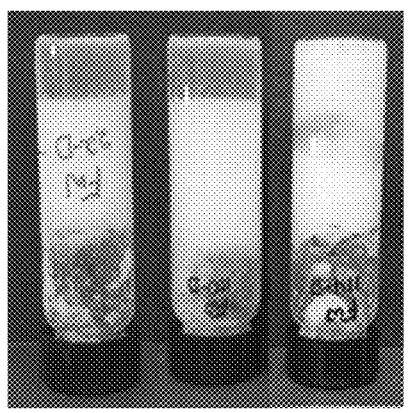
Figure 4:
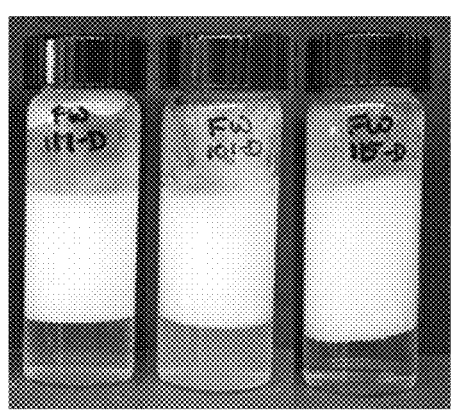
Figure 4:
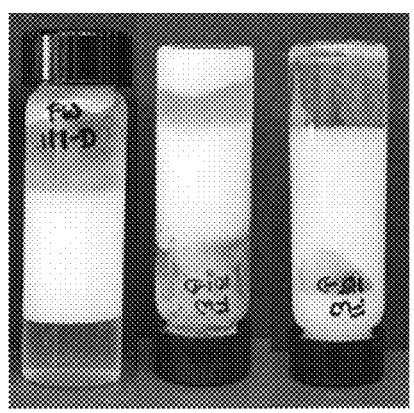

FIG. 4 includes a set of photographs comparing the physical appearance of samples composed of Alu C nanoparticles with (from left to right) IL13, AB13 and NaOleate of (A) Ratio 0, (B) Ratio 5, (C) Ratio 10 and (D) Ratio 50.

Figure 5:
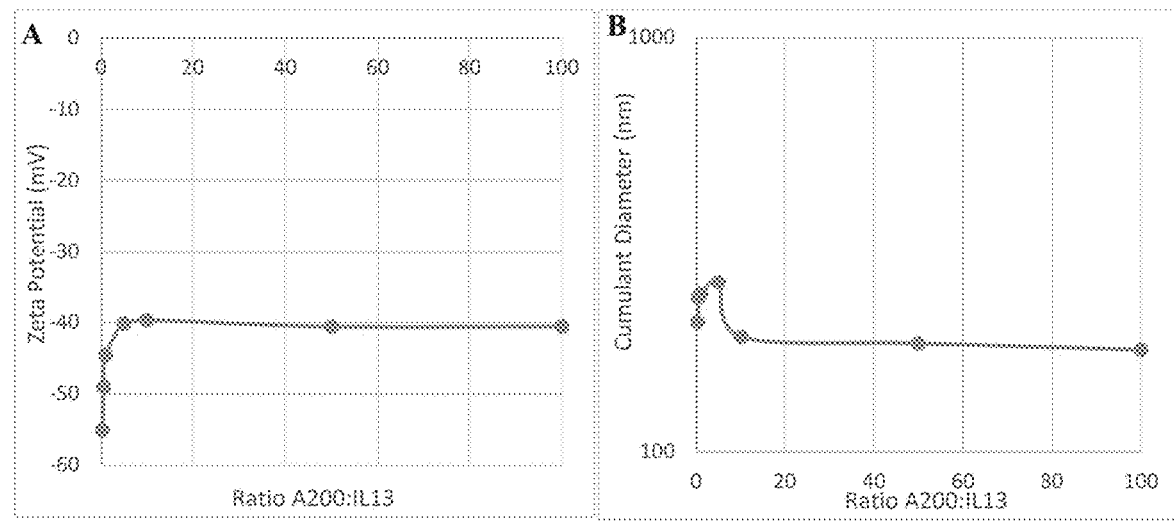

FIG. 5 includes two line graphs showing: A) Zeta potential and (B) cumulant diameter of samples composed of different concentrations of IL13 and a fixed concentration (0.5 wt. %) of Aerosil 200 nanoparticles.

Figure 6:
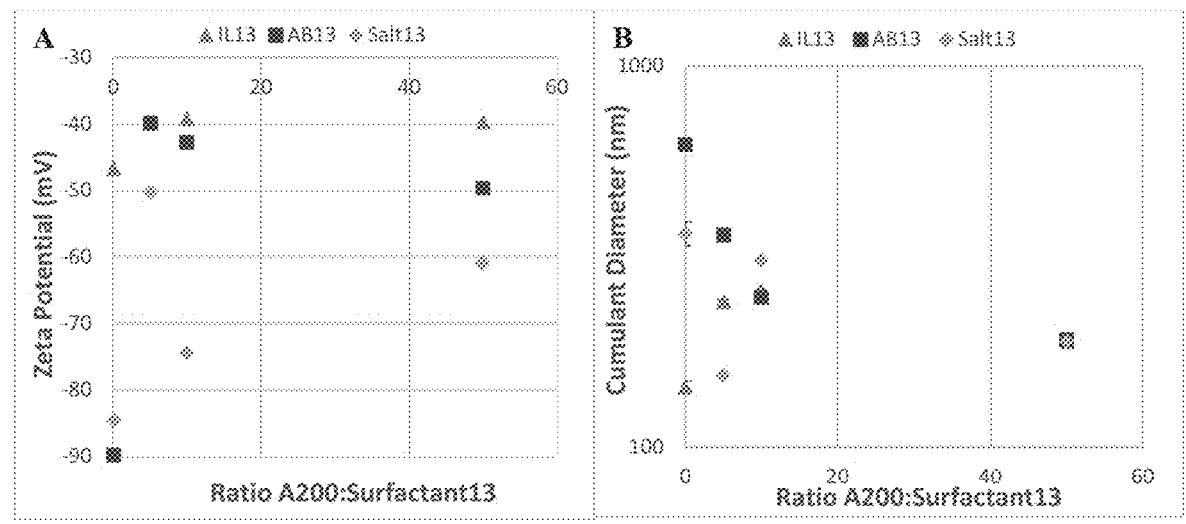

FIG. 6 includes two plots showing a comparison of measured parameters of (A) Zeta Potential and (B) Cumulant Diameter of samples consisting of Ratio 0, 10 and 50 of Surfactant 13 with Aerosil 200.

Figure 7:
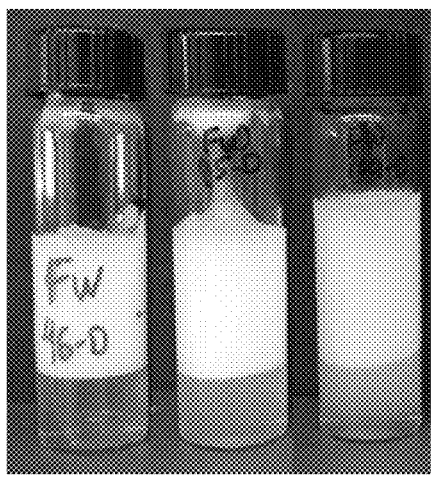
Figure 7:
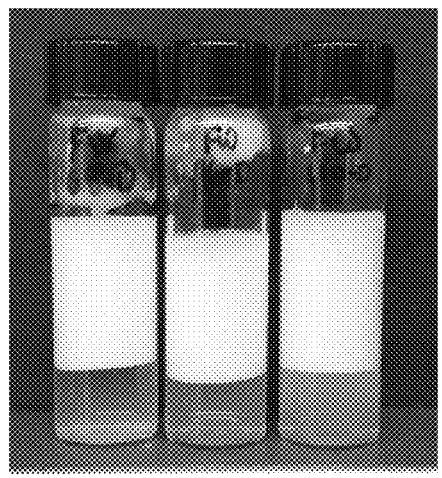
Figure 7:
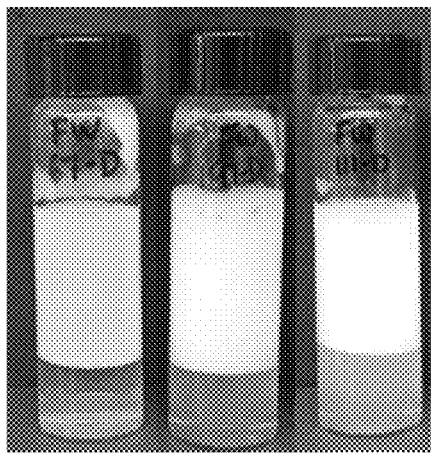
Figure 7:
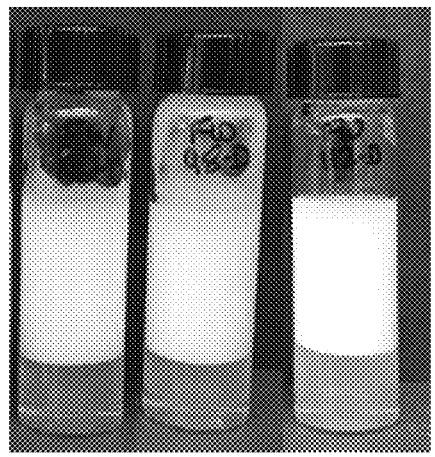

FIG. 7 includes 4 photographs comparing physical appearances of samples composed of A200 nanoparticles with (from left to right) IL13, AB13 and NaOleate of (A) Ratio 0, (B) Ratio 5, (C) Ratio 10 and (D) Ratio 50.

Figure 8:
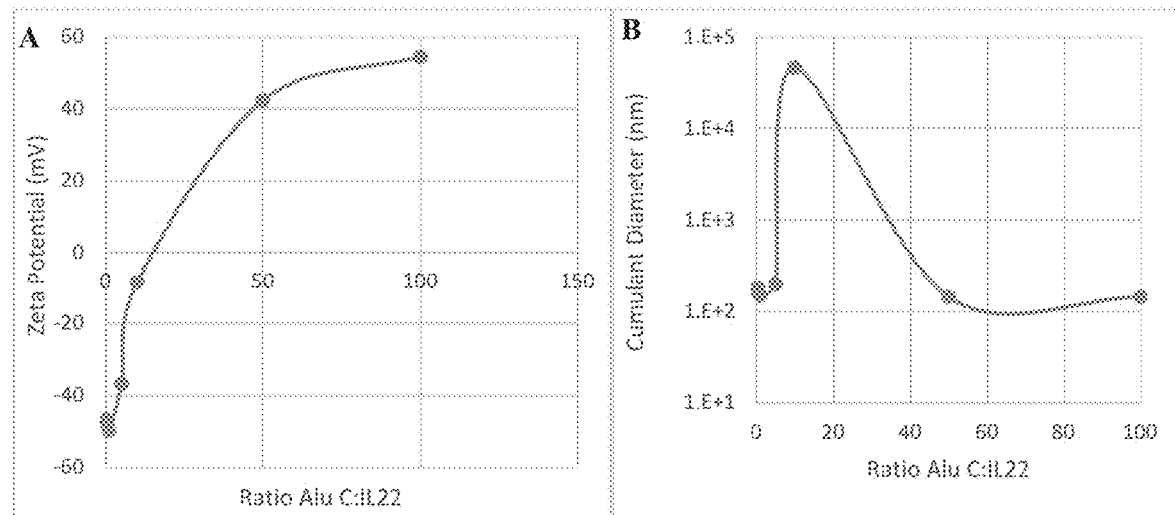

FIG. 8 includes two line graphs showing measured parameters of (A) Zeta Potential, (B) Cumulant Diameter of samples composed of IL22 and Alu C nanoparticles.

Figure 9:
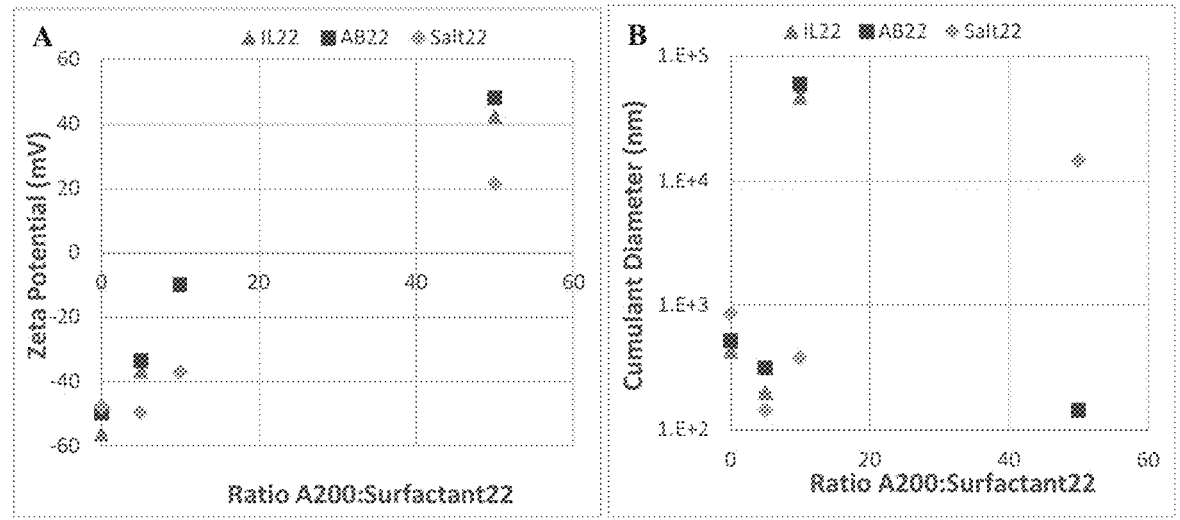

FIG. 9 includes two plots showing a comparison of measured parameters of (A) Zeta Potential, (B) Cumulant Diameter of samples consisting of Ratio 0, 10 and 50 of Surfactant 22 with Alu C.

Figure 10:
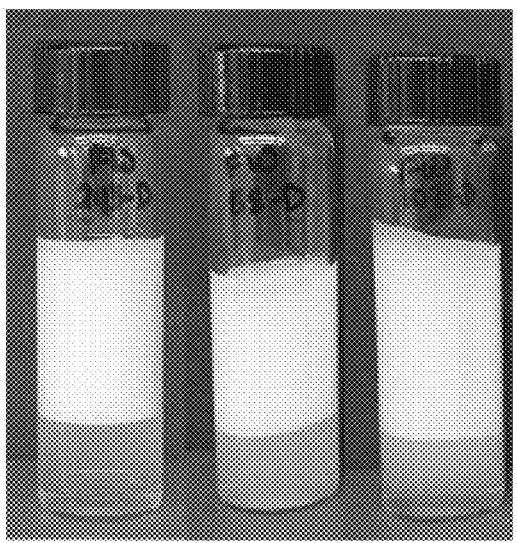
Figure 10:
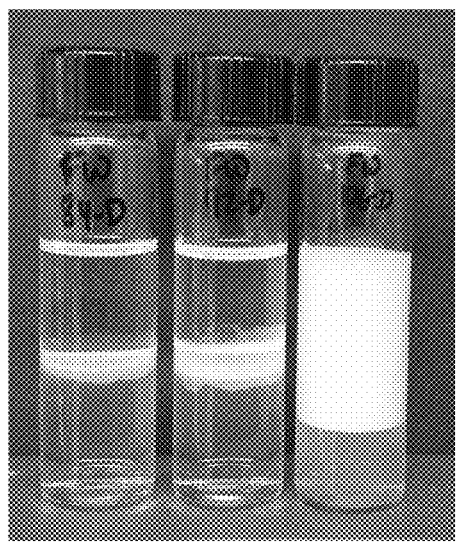
Figure 10:
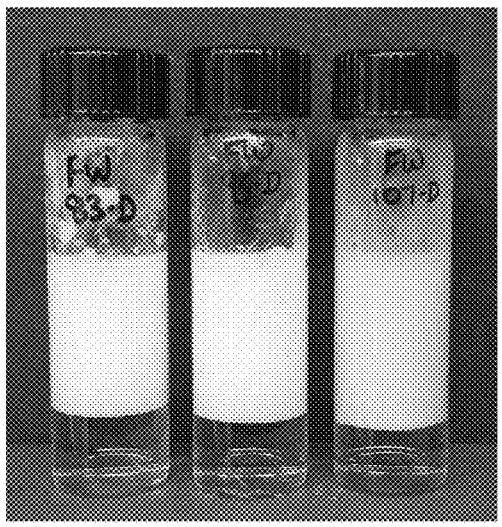
Figure 10:
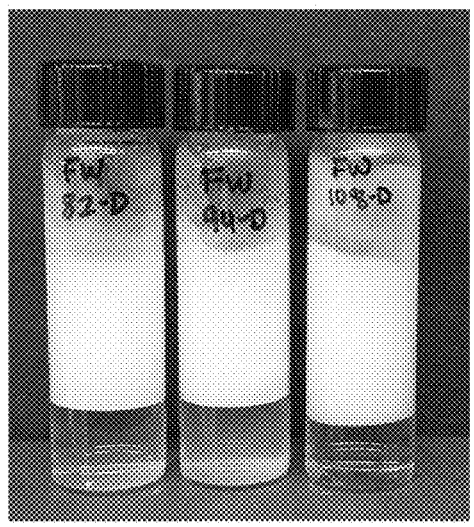

FIG. 10 includes four photographs comparing physical appearances of samples composed of Alu C nanoparticles with (from left to right) IL22, AB22 and SDBS of (A) Ratio 0, (B) Ratio 5, (C) Ratio 10 and (D) Ratio 50.

Figure 11:
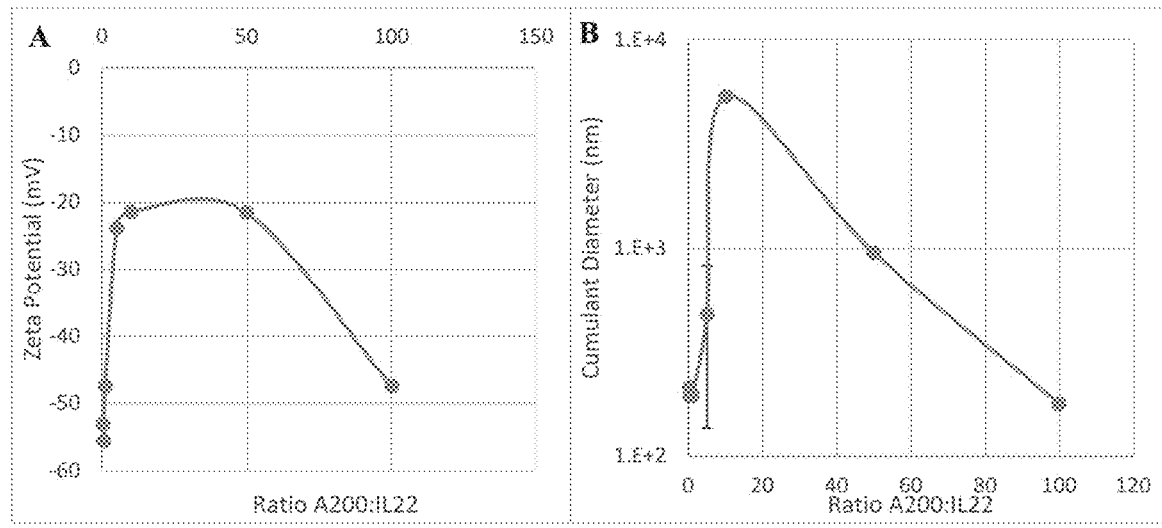

FIG. 11 includes two line graphs providing a comparison of measured parameters of (A) Cumulant Diameter, (B) Zeta Potential for variable concentrations of IL22 and fixed concentration (0.5 wt. %) of A200 nanoparticles.

Figure 12:
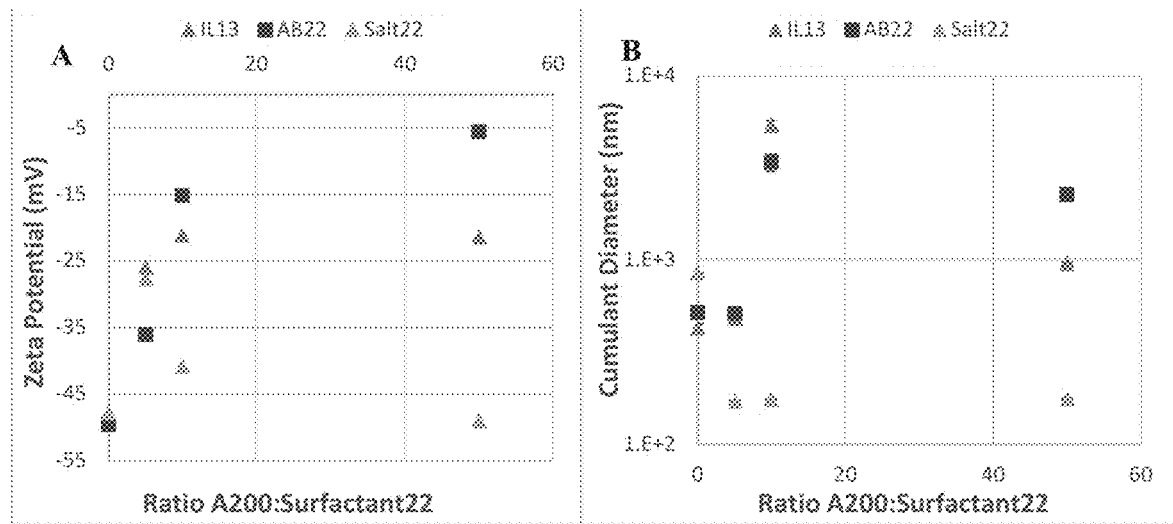

FIG. 12 includes two plots providing a comparison of measured parameters of (A) Zeta Potential, (B) Cumulant Diameter of samples consisting of Ratio 0, 10 and 50 of Surfactant 22 with A200.

Figure 13:
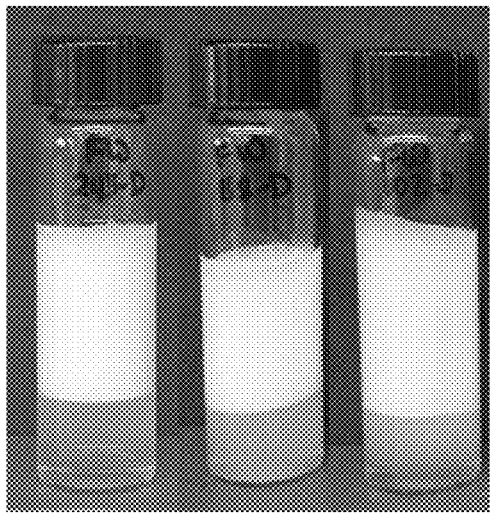
Figure 13:
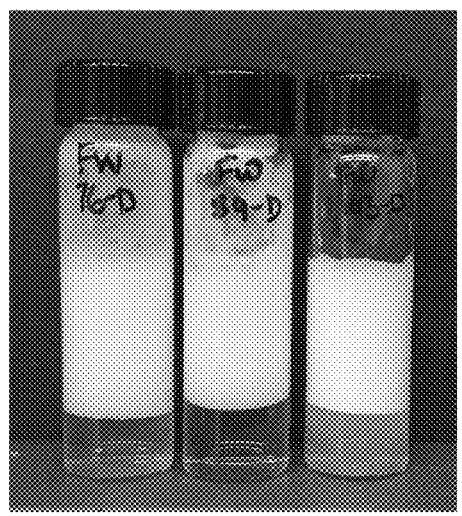
Figure 13:
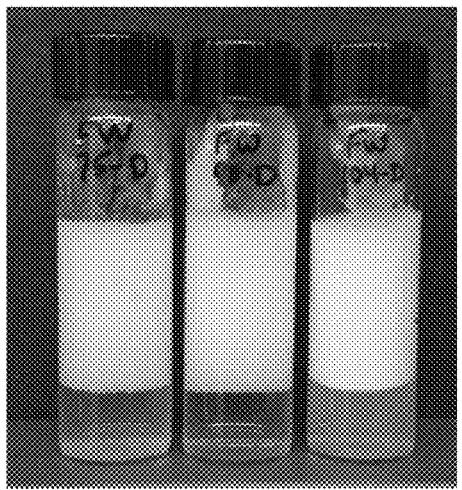
Figure 13:
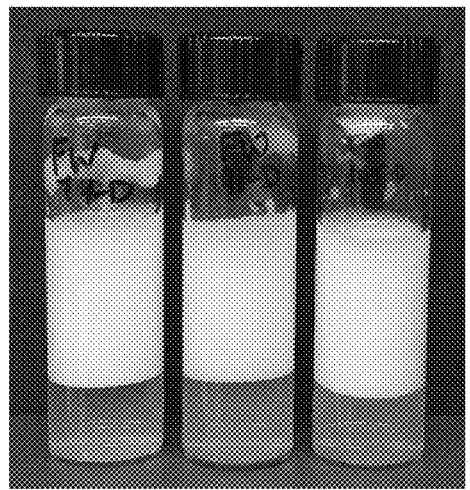

FIG. 13 includes four photographs comparing physical appearances of samples composed of A200 nanoparticles with (from left to right) IL22, AB22 and SDBS of (A) Ratio 0, (B) Ratio 5, (C) Ratio 10 and (D) Ratio 50.

Figure 14:
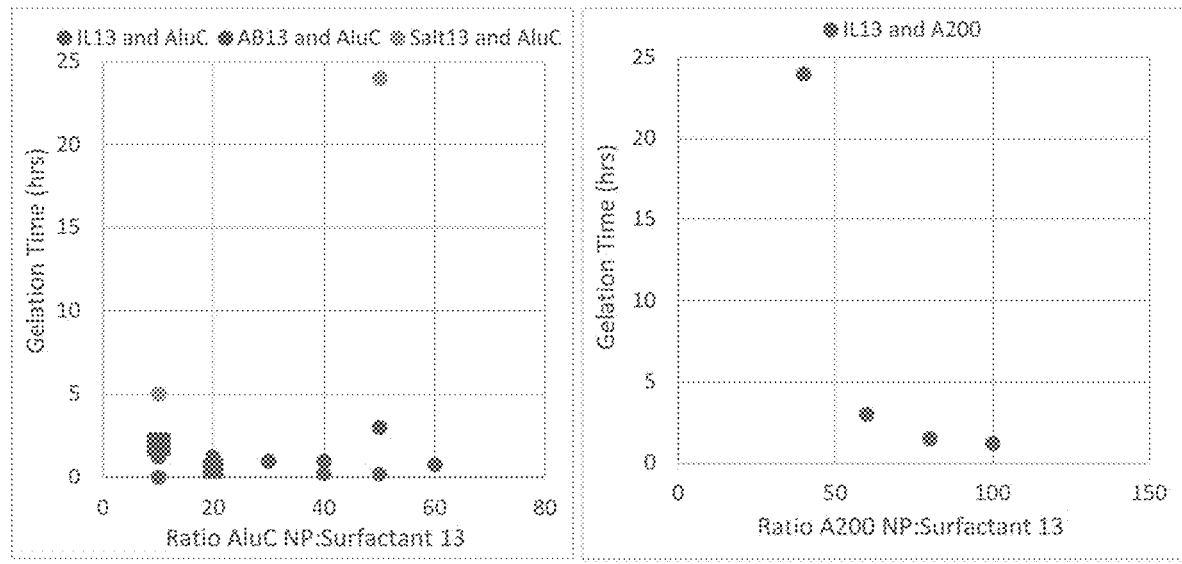

FIG. 14 includes two plots showing gelation time of IL13, AB13, and NaOleate with Alu C and A-200.

Figure 15:
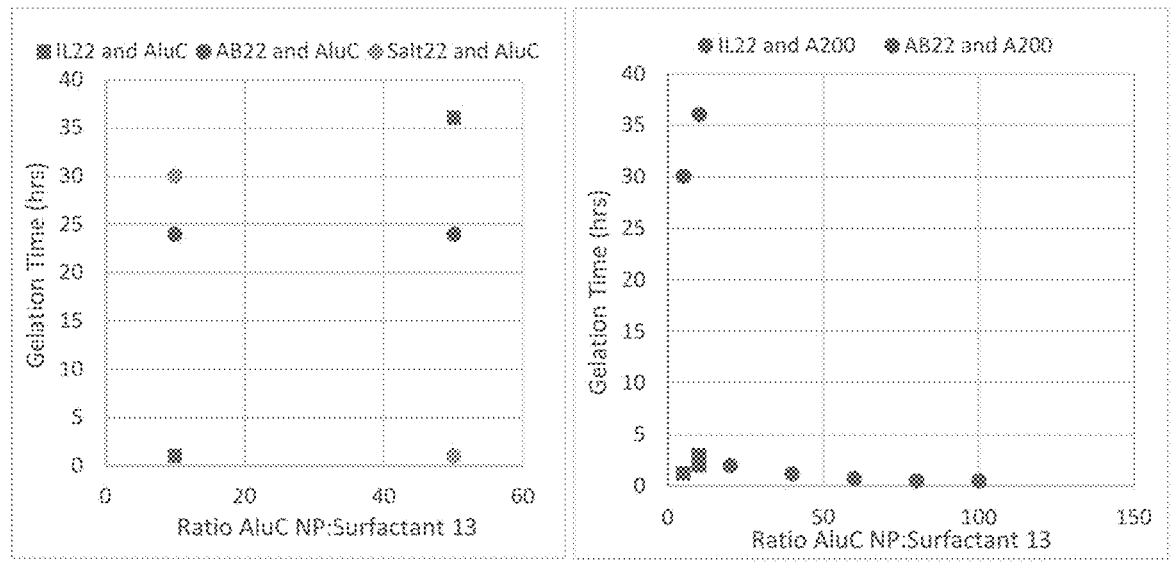

FIG. 15 includes two plots showing gelation time of IL22, AB22, and SDBS with Alu C and A-200.

Figure 16:
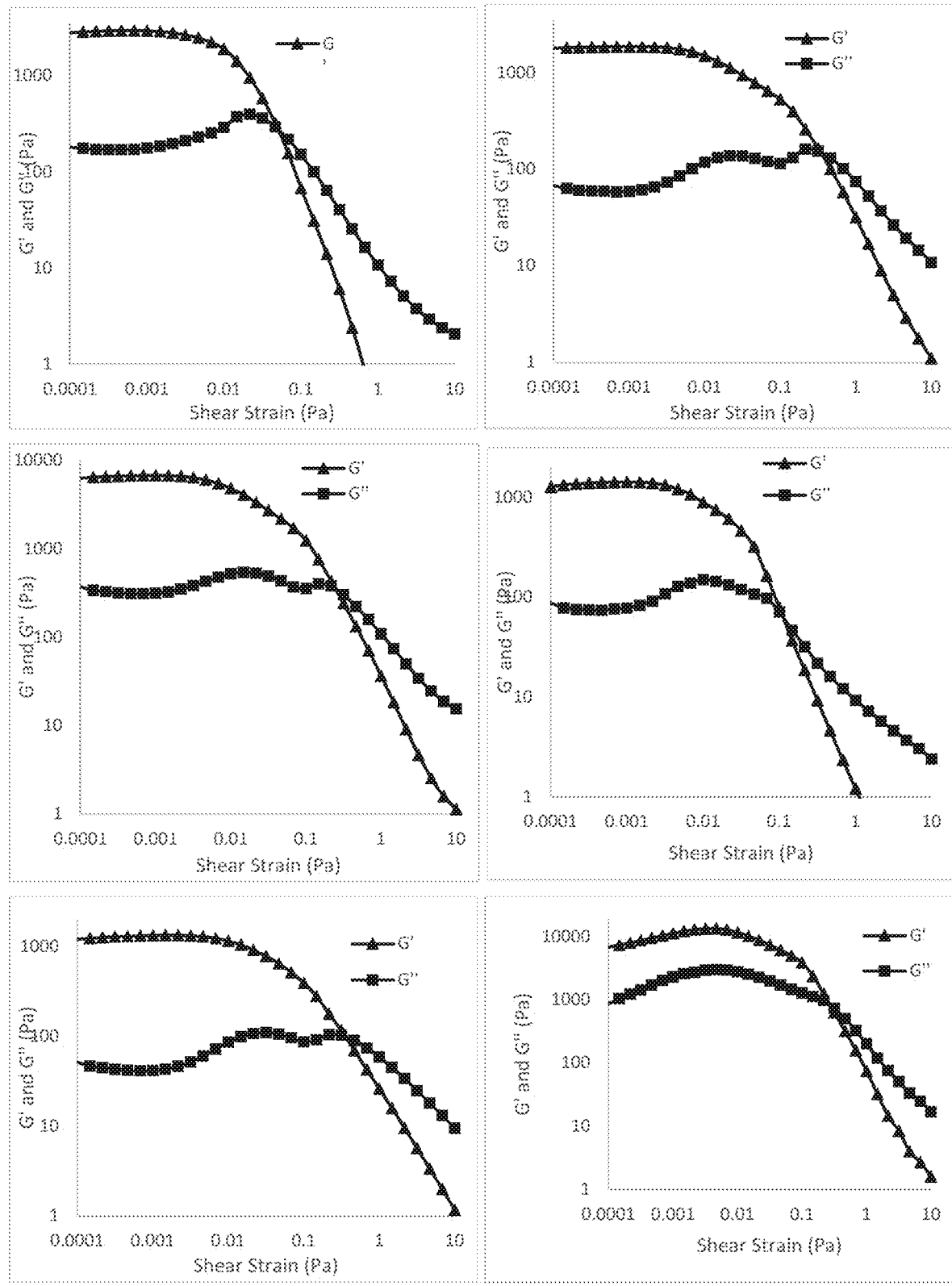
Figure 16:
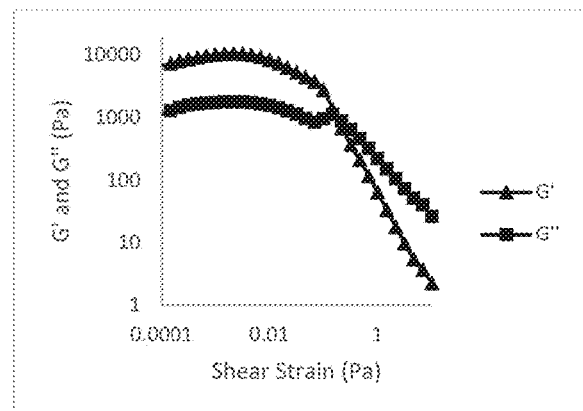

FIG. 16 includes 7 graphs showing the results of amplitude sweep analysis of CV70-CV76.

Figure 17:
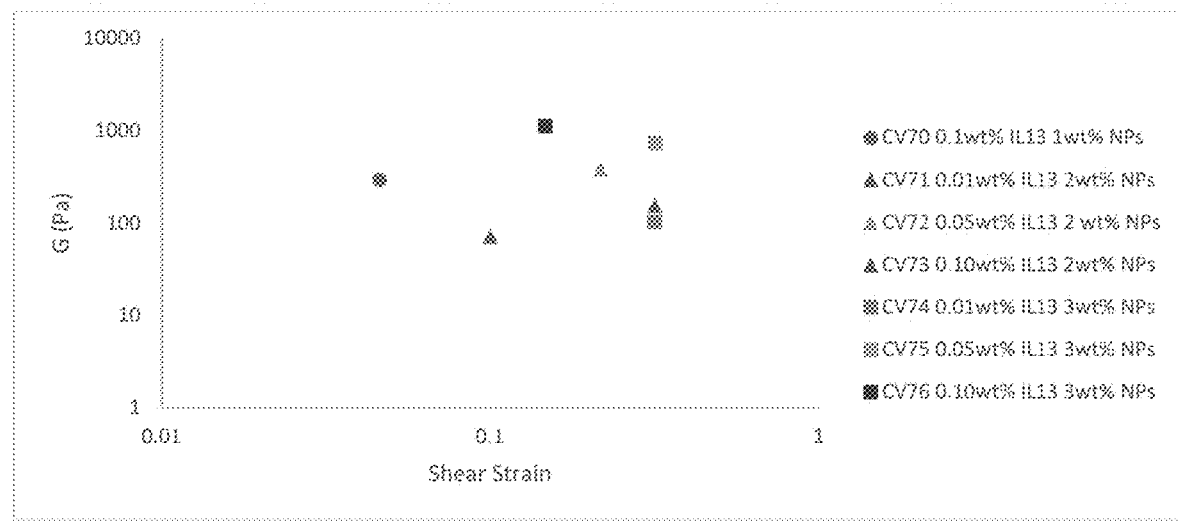

FIG. 17 is a plot showing flow point of emulsions at 25° C. The symbols are grouped by constant NP concentration but varying IL13 concentration.

Figure 18:
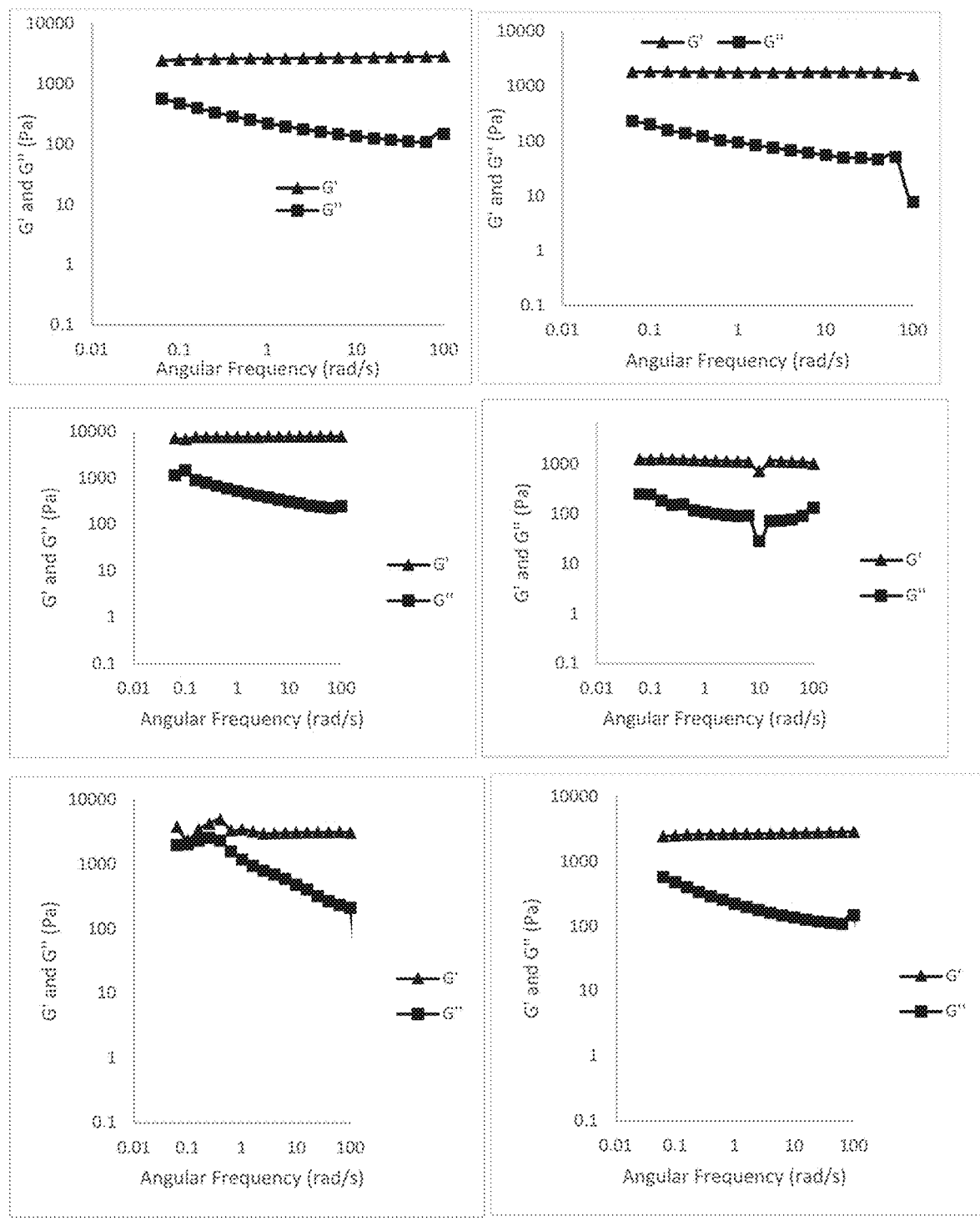
Figure 18:
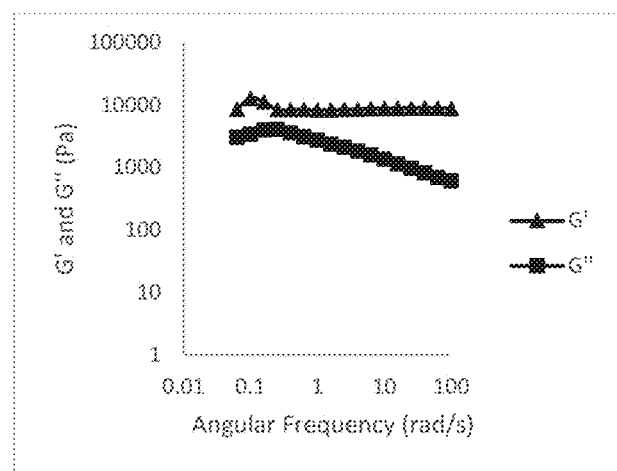

FIG. 18 includes 7 graphs showing the results of the frequency sweep analysis of CV70-CV76. Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The initial step of emplacing the gel-form material involves admixing solid nanoparticles with gelation supporting amounts of an anionic species and a cationic species in an aqueous media to provide a particle-loaded aqueous media, for example to form a hydrosol that is a relatively stable dispersion of solid colloidal particles in an aqueous liquid. The colloidal stability of the particle-loaded aqueous media may vary, and in select embodiments the components may be selected so that the particles do not aggregate in the stable dispersion under typical conditions of use and/or storage. The particle-loaded aqueous media may for example be colloidally stable under stabilized conditions that include an average or maximum gravitational force during the stabilized period of 1 gravity, and/or ambient temperature (or a temperature above a freezing point and/or below a boiling point of the media).

The nanoparticles may, for example, be made up substantially of a metal or a metal oxide, such as silicon oxide, iron oxide or aluminum oxide. These nanoparticles may, for example, have an average dimension ranging from 1 nm to 100 nm.

The anionic and cationic species may for example be surfactants, and/or members of an ionic liquid species pair. If members of an ionic species pair, the species may be selected as being capable of forming an ionic liquid under appropriate conditions. As exemplified here, the selection of the surfactant or ionic species, and of the nanoparticle material, in large part dictates the rheological properties of the gel-form material. This selection accordingly affords an opportunity to rheologically tune the gel-form material to its intended purpose.

The particle-loaded aqueous media may then be admixing with an organic solvent, to produce an initial emulsion having a liquid-like state. The organic solvent may for example be characterized as having a dielectric constant of less than 15. This initial emulsion may also be stable, in the sense that the emulsion does not separate into phases under typical conditions of use and/or storage. The initial emulsion may then be emplaced in a porous subterranean formation, for example through an injection well, in the liquid-like state to form an emplaced emulsion. The emplaced emulsion then undergoes a transition to a gel-like state in situ in the subterranean formation. This transition results in the gel-form material, in some embodiments this takes place in a process analogous to gelation, so that the material becomes viscous and develops rigidity and fills the bulk of the volume originally occupied by the initial emulsion. The gel-form material may for example be characterized as having a storage G' modulus greater than its loss modulus G".

As is exemplified herein, it has been discovered that the selection of the nanoparticle:ion ratio, together with the selection of the components of the gel-form material, may be carried out so as to determine the gelation time during which the emplaced emulsion transitions from the liquid-like state to the gel-like state. The gelation time may for example be a function of the absolute concentration of nanoparticles and how close the zeta potential of the particles is to zero. This characteristic allows for the emplacement, for example in a hydrocarbon reservoir, of a rheologically tuned gel-form nanoparticle material, with the formation of the gel-like state being deliberately timed for the particular purpose served by the gel-form material.

The nanoparticles may for example be present in the gel-form material in an amount ranging from 0.001 wt. % to 50 wt. %. The weight ratio of the combined anionic and cationic species to the nanoparticles in the gel-form material may for example range from 1:10 to 10:1 combined species to nanoparticles.

In select embodiments, the subterranean formation, such as a hydrocarbon reservoir, may for example be characterized by porosities of from about 0.1% to 35%; and/or by permeabilities of 1 to 1000 millidarcys. The gel-form material may accordingly be used to provide a barrier to fluid flow in the formation, by reducing effective porosity and/or permeability.

The ionic liquid species pair, together in isolation, may be selected on the basis that they form an ionic liquid, for example at a temperature below 200° C. Exemplary ionic liquids may include tetra-N-butylammonium oleate ([N4444][oleate]), tetra-N-butylammonium dodecylbenzene sulfonate ([N4444][DBS]), butylammonium oleate ([$C_4NH_3$][oleate]), N-octylammonium oleate ([$C_8NH_3$][Oleate]), tri-ethylammonium oleate ([$HN_{222}$][oleate]), tri-N-butylammonium oleate ([$H N_{444}$][oleate]), tri-N-octylammonium oleate ([$HN_{888}$][oleate]), N-octylammonium dodecylbenzenesulfonate ([$C_8NH_3$][DBS]), butylammonium dodecyl benzenesulfonate, tri-ethylammonium dodecyl benzenesulfonate, tri-N-butylammonium dodecyl benzenesulfonate, or tri-N-octylammonium dodecyl benzenesulfonate. The ionic liquid species pair may for example include a primary, secondary, tertiary or cyclic amine; and/or a primary, secondary or tertiary alkyl amine. Alternatively, the ionic liquid species pair may include one or more primary carboxylic acid or sulfonic acid, saturated or unsaturated, alkyl sulfonic acid or primary, saturated or unsaturated alkyl benzene sulfonic acid.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

EXAMPLES

The following examples illustrate the structure of a variety of emulsions, the interactions between the IL and the NPs, as well as extend the gelation period of the emulsions that form gels. The examples illustrate that as the NP concentration increases, the dodecane droplet size in the macro emulsion increases. The opposite is true for ILs. As the IL concentration increases, the size of the dodecane droplet decreases. As exemplified in rheology data, droplet size does not correlate to the stability of the gels formed by the emulsions. Different combinations of nanoparticles and surface-active agents follow the same trend overall. However, the time scale of gelation is different for each combination depending on the degree of change of the zeta potential. The gelation period was extended somewhat through the use of heat and by changing the IL to NP ratio, as well as the concentrations of both IL or other surface-active agents and NPs. The gelation times vary from instantaneous to 35 hrs using the different combinations of nanoparticles and surface-active agents. These examples accordingly illustrate the use of dispersions of solid nanoparticles decorated with ionic species in emulsions that have tuned gelation properties, and these properties can be utilize when these materials are emplaced in porous media.

Materials

Aerosil-200 silicon dioxide nanoparticles and Alu C aluminum dioxide nanoparticles were purchased from Evonik. Tetra-N-butylammonium hydroxide ($N_{4444}OH$, 40% aq. solution), N-Dodecane (>99% purity), Sodium Oleate (>99% purity), 4-dodecylbenzene sulfonic acid (DBSA, 95% purity), and sodium dodecylbenzene sulfonate (SDBS) were purchased from Sigma Aldrich (Oakville, Ontario). Oleic acid (90% purity) was purchased from VWR International (Edmonton, AB, Canada). A Milli-Q purified the water used, and its conductivity was 0.25 µS/cm as measured by the FE30/EL30 conductivity meter (Mettler-Toledo Instruments Co., Switzerland). The surface tension of water was 72.8 mN m$^{-1}$ at 25° C.

IL was synthesized as described in McCrary et al. 2013, incorporated herein by reference. 50 mmol of $N_{4444}OH$ were weighed into a 200 ml round bottom flask placed in a water bath on top of a magnetic stirrer. Another 50 mmol of acid was weighed and loaded into burette with a stopcock. The acid was allowed to drip into the flask with a rate of one drop per second while stirring the mixture at 700 rpm. The mixture was then stirred overnight, and then the IL was collected and stored in an air-tight container. IL was then diluted in DI water to 1.5 wt. % and used as a stock solution for the experiments conducted in this work. Two ILs were synthesized and used as models in this work (Table 1). Their respective ABs and ASBs were also prepared and tested.

TABLE 1

Composition of ILs and their respective ABs and ASBs

| Name | Chemical Name | Formula |
| --- | --- | --- |
| IL13, AB13 | tetra-N-butylammonium oleate | [$N_{4444}$][oleate] |
| Salt13 | Sodium oleate | NaOleate |
| IL22, AB22 | tetra-N-butylammonium dodecylbenzene sulfonate | [$N_{4444}$][DBS] |
| Salt22 | Sodium dodecylbenzene sulfonate | SDBS |

In a 20 ml scintillation vial, the correct amount of Alu C nanoparticles (NPs) was weighed analytically. The correct amount of De-Ionized Water (DIW) was then added to the vial. The vial was swirled gently to wet the particles. IL was then added via pipette to the vial. A magnetic stir bar was then added to the vial and placed on the multi-stir plate at a setting of 5 for one hour. The stir bar was removed from the vial, and the sample vial was sonicated in an ice bath with a 420 ultrasonic probe at an amplitude of 50, for 5 minutes (with a 30 second pulse time). 3 ml of sonicated solution was weighed analytically into a new, clean, 10 ml scintillation vial. 3 ml of dodecane was added analytically to the top of the NP solution by pipette (so there is equal volume of both phases). Phase levels were marked on the vial. The Pro Scientific homogenizer PRO200 (18,000 rpm) was used with the smallest probe to homogenize the dodecane/aqueous solution for 2 minutes. Samples were analyzed on the DLS, optical microscope, rheology, and via cryo-SEM.

In the following examples, the interaction between nanoparticles and ILs and their respective ABs and ASBs will be illustrated. The phase behavior and emulsion characteristics of different ILs and their ABs and ASBs is exemplified, comparing samples prepared with varying concentrations of IL, A, and ASB with both positive Alu C nanoparticles and negative A200 nanoparticles respectively. Surfactants are also compared.

Example 1: IL13, AB13, and NaOleate

Alu C Nanoparticles

The interaction between IL13, AB13 or NaOleate and Alu C nanoparticles in aqueous dispersions is illustrated herein. Several ratios of nanoparticles and IL were prepared for several constant absolute values of nanoparticles. The dispersions were prepared using the ultrasonic probe (section 2) for 5 minutes. For a constant weight fraction of Alu C, with increasing the concentration of IL13 in the solution, the surface coverage of IL13 on the nanoparticles increases from partial monolayer to a full monolayer to multiple layers. Hence, the zeta potential and correspondingly the nanoparticle size changes. FIG. 1A shows that as the ratio changes the zeta potential changes from highly negative to highly positive passing through the zero-zeta potential. At the extreme zeta potential, the dispersion is stable. At zeta potential goes close to zero, the nanoparticles flocculated and precipitated (FIG. 1B).

As shown in FIG. 1, regardless of the absolute weight fraction of either the IL13 or Alu C, the ratio is the key parameter. Hence, for the rest of the examples, the nanoparticle concentration is fixed at 0.5 wt. % and the concentration of ILs or their corresponding ABs and ASBs is varied.

Figure 2:
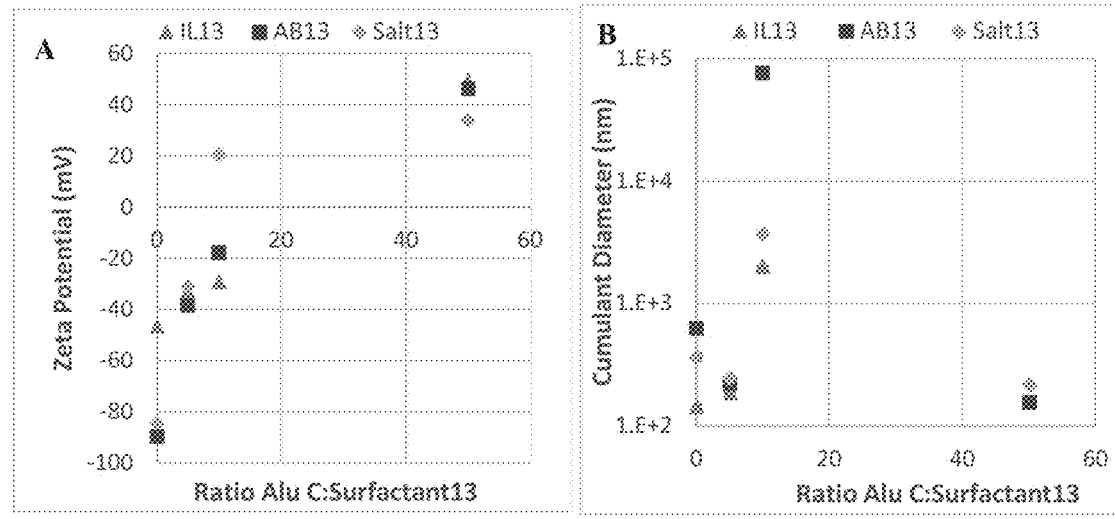

AB13 and NaOleate follow the same trend with respect to the effect of zeta potential and particle size (FIG. 2). Notably, at a zeta potential close to zero, AB13 diffuses more quickly and causes flocculation more rapidly compared to IL13, although they have the same components.

The dispersions discussed above were used to form an emulsion with N-Dodecane as the oil phase. The water-oil ratio was kept at 1:1 v/v. The emulsion behavior was found to be dependent on the zeta potential and particle size. Stable dispersions with higher absolute value of zeta potential are less viscous. While unstable dispersions with zeta potentials close to zero tend to gel over time. The gelation time is shown to be a function of the absolute concentration of nanoparticles and how close the zeta potential is to zero.

To illustrate the behavior of IL13 to AB13 and NaOleate, 4 samples of each formulation with a constant Alu C nanoparticle were prepared. The exemplified ratios of nanoparticles to surfactant were 0, 5, 1, and 50. These were selected around the isoelectric point, and where significant changes were noticed with the samples prepared with IL13 and Alu C. Ratio 0 (No Nanoparticles added) was prepared with 0.1 wt. % of the surfactant as a baseline. For the remaining samples, the concentration of nanoparticles was kept fixed at 0.5 wt. % while the concentration of surfactants was varied. FIG. 3 shows a comparison of measured parameters of Zeta Potential and Cumulant Diameter of samples consisting of Ratio 0, 10, and 50 of Surfactant 13 with Alu C.

Samples of AB13 and NaOleate with Alu C both showed similar general trends as the samples prepared with IL13 and Alu C with each of the measured parameters. One of the major differences found was the zeta potential of AB13 and NaOleate, which was found to be approximate −90 mV while the zeta potential of IL13 was approximate −50 mV. Ratio 10 of the AB13 samples was found to have a negative zeta potential that was closer to the isoelectric point, while ratio 50 had a zeta potential exceeding 45 mV. pH was also seen to be relatively constant; however, when the polarity changed, there was a significant decrease seen.

While the zeta potential of NaOleate solution was similar to AB13 solution, the pH of NaOleate was found to be more basic. The main difference seen in the NaOleate trend was that at Ratio 10, the zeta potential was positive implying that the isoelectric point was at a ratio below 10 and at a lower ratio than when prepared with IL13 or AB13. Similar to the samples with AB13, the pH was relatively constant; however, at ratio 50, there was a decrease seen FIG. 4 shows the photographs comparing the physical appearances of samples composed of Alu C nanoparticles with IL13, AB13, and NaOleate. Ratio 0 all produced liquid-like emulsions that were white. Their viscosity increased slightly within the next few hours. At ratio 5 for samples of IL13 and AB13, the emulsions immediately separated into 3 layers after homogenization: an upper dodecane layer, lower aqueous phase layer, and a small emulsified layer. However, the NaOleate and Alu C emulsion never emulsified and separated into its two phases with a very thin film layer between it. Both layers were also turbid. At ratio 10, each of the samples gelled within 2 hours after preparation. Samples of ratio 50 appeared to have gelled after 24 hours. However, when they were inverted, the material slowly flowed downwardly.

Emulsion samples of AB13 had a wider droplet diameter distribution. As the ratios of each of the samples increased, the droplet distribution became more uniform. Initially, at ratio 0, there was a higher content of very small droplets, especially for the NaOleate emulsion. For ratio 10 and 50, the droplet diameter distribution was almost identical Aerosil 200 Nanoparticles An aqueous phase with a fixed concentration of 0.5 wt % A200 nanoparticles and different weight percentages of IL13 (0%, 0.005%, 0.01%, 0.05%, 0.1%, 0.5%, 1.0%, and 1.5%) was prepared in de-ionized water. As IL13 concentration increased, the clarity of the samples decreased; however, the viscosity of the mixtures remained consistent. FIG. 5 shows the zeta potential and cumulant diameter of samples composed of different concentrations of IL13 and a fixed concentration (0.5 wt. %) of Aerosil 200 nanoparticles. The zeta potential was seen to be relatively constant around −40 mV. As IL13 concentration increased above 0.5 wt. %, the zeta potential was found to increase towards the zeta potential of the stock IL13. Particle size increased very slightly, however; diameter measurements remained below 260 nm. pH values were also seen to transition from neutral to basic To illustrate the behavior of IL13 to AB13 and NaOleate, 4 samples of each formulation with a constant Aerosil 200 nanoparticle were each prepared. The selected ratios of nanoparticles to surfactant were 0, 5, 10, and 50. These were selected around the isoelectric point and where significant changes were noticed with the samples prepared with IL13 and Aerosil 200. Ratio 0 (No Nanoparticles added) was prepared with 0.1 wt. % of the surfactant as a baseline. For the remaining samples, the concentration of nanoparticles was kept fixed at 0.5 wt. % while the concentration of surfactants was varied. FIG. 6 shows a comparison of measured parameters of Zeta Potential and Cumulant Diameter of samples consisting of Ratio 0, 10, and 50 of Surfactant 13 with Alu C.

Samples of AB13 showed almost identical parameter measurements and visual observations to the IL13 samples except ratio 0. The samples of NaOleate and Aerosil 200 had much higher zeta potentials and pHs than the other samples, with the ratio 10 samples having a value of −72 mV while for ratio 50 it was measured at −62 mV. FIG. 7 shows the photographs comparing physical appearances of samples composed of A200 nanoparticles with IL13, AB13, and NaOleate. Each of the emulsions prepared remained liquid-like with a slight increase in viscosity over the next 24 hours. Similar to the zeta potential and pH measurements, NaOleate measured much higher electrical conductivities than emulsions prepared with IL13 and AB13. The water phase that was released from creaming increased in turbidity from IL13 to AB13 to NaOleate. Similarly, to the previous samples, emulsion samples of AB13 had a wider droplet diameter distribution that was almost similar at each ratio. For each ratio of NaOleate samples, there was a higher content of smaller droplets while for IL13 samples, the distribution was more uniform except at ratio 10 where there was a spike at the lower end of the distribution spectrum Example 2: IL22, AB22, and SDBS Alu C Nanoparticles For this example, samples were prepared with a fixed concentration of 0.5 wt. % Alu C nanoparticles and varying weight percentages of IL22 (0%, 0.005%, 0.01%, 0.05%, 0.1%, 0.5%, 1.0%, and 1.5%) in de-ionized water. FIG. 8 shows the measured parameters of Zeta Potential and cumulant Diameter of samples composed of IL22 and Alu C nanoparticles. As the IL22 concentration was increased, the zeta potential trend seen was a decrease from high positive potentials (zeta potential of Alu C) towards zero. For ratios greater than 10 of nanoparticles to IL22, the polarity was seen to switch, and the zeta potentials continued to increase towards −50 mV (zeta potential of IL22 solution). Particle diameter size was seen to reflect the zeta potential data. As the zeta potential was seen to approach 0 mV, the pH measurements increased from 6 towards 9. As the zeta potential became more positive, the pH values decreased to acidic pHs (approaching the pH of IL22).

When the Alu C nanoparticle concentration was kept constant, and IL22 concentration was increased, the zeta potential was seen to decrease, approaching 0 mV (occurs around Ratio 10). As IL22 continued to increase, the zeta potential switches polarity and continues to increase. Particle size reflected zeta potential data and was seen to decrease from high positive values as it approached the isoelectric region and then increase in the negative region. pH was seen to increase from 6.5 to 8.75, then decrease to an acidic pH as it exceeded the isoelectric point.

To illustrate the behavior of ionic liquids to acid-base solutions and the acid salt of IL, 4 samples of acid-based solution (AB22) and SDBS with both Alu C and A200 nanoparticles were each prepared. The selected ratios of nanoparticles to surfactant were 0, 5, 10 and 50. These were selected around the isoelectric point and where significant changes were noticed with previously prepared samples. Ratio 0 was prepared with 0.1 wt. % of the surfactant. For the remaining samples, the concentration of nanoparticles was kept fixed at 0.5 wt. % while the concentration of surfactants was varied.

FIG. 9 shows the comparison of measured parameters of zeta potential and cumulant diameter of samples consisting of Ratio 0, 10 and 50 of Surfactant 22 with Alu C. Samples of AB22 and SDBS with Alu C both showed similar general trends as the samples prepared with IL22 and Alu C with each of the measured parameters. While the zeta potential of each of the surfactant 22 solutions is around −50 mV, the pH of IL22 and AB22 are acidic with values around 3 and 3.5 respectively while the pH of SDBS solution is basic and measures at around 8. Each of the measured parameters for the IL22 and AB22 samples was very similar to one another. The zeta potential of the SDBS samples was similar at ratio 0 and 5. As the ratio increased to 10, the zeta potential was seen to decrease to −37 mV; however, it was not as close to its isoelectric point as the IL22 and AB22 samples. At ratio 50, each of the measured zeta potentials was positive with both IL22 and AB22 having values greater than 40 mV, while the SDBS nanoparticle dispersion was about 21 mV.

FIG. 10 shows the photographs comparing physical appearances of samples composed of Alu C nanoparticles with IL22, AB22, and SDBS of Ratio 0, Ratio 5, Ratio 10, and Ratio 50. Ratio 0 emulsions were all liquid-like emulsions that were white with viscosity increasing slightly within the next few hours. At ratio 5 for samples of IL22 and AB22, the emulsions immediately separated into 3 layers after homogenization: an upper dodecane layer, lower aqueous phase layer, and a small emulsified layer. However, the SDBS and Alu C emulsion remained as a liquid-like emulsion. At ratio 10, each of the emulsions was initially liquid-like and became very viscous within the next hour. The samples prepared with IL22 and AB22 gelled after an hour. However, the sample prepared with SDBS remained very viscous (flowed like honey). At ratio 50, each of the emulsions was liquid-like and became very viscous within the next hour. After 24 hrs, all samples appeared to be gelled; however, when turning over the vials, only the sample prepared with SDBS remained unmoved. Emulsion droplet distribution was also not analyzed for the samples of ratio 5 as only the SDBS with Alu C sample produced an emulsion. Emulsion samples of AB13 were found to have had a wider droplet diameter distribution except for the case of ratio 0. At ratio 0, the droplet distribution was found to be the most uniform of the samples. At ratio 10, there was a higher content of smaller droplets (less than 10 μm in diameter), especially in the SDBS sample. At ratio 50, each of the samples had similar droplet distribution trends. However, the distribution of IL22 and SDBS with Alu C became more uniform again.

Aerosil 200 Nanoparticles

The aqueous phase with a fixed concentration of 0.5 wt % A200 nanoparticles and different weight percentages of IL22 (0%, 0.005%, 0.01%, 0.05%, 0.1%, 0.5%, 1.0%, and 1.5%) were prepared in de-ionized water. As IL22 concentration increased, the clarity of the samples decreased; however, the viscosity of the mixtures remained consistent. The zeta potential was first seen to decrease towards −20 mV and as IL22 concentration exceeded 0.05 wt. %, the zeta potential was seen to increase, becoming more negative again. Particle size reflected the zeta potential data and was seen to slightly increase as the potential decreased and then decrease as the zeta potential became more negative again.

When comparing the samples with similar ratios, it was seen that the samples with lower ratios show similar data measurements. PSD and zeta potential data was significantly different for samples with ratios above 20. The higher concentration of additive to the amount of sample prepared affected the clarity of the samples and aggregation of the particles was more prominent Similar to the samples prepared with Alu C nanoparticles, samples prepared with IL22 and AB22 with A200 nanoparticles gave some similar parameter measurements. At ratio 5 however, the zeta potential of AB22 and SDBS were closer to each other, approximately −33 mV, while the zeta potential of the IL22 sample was at −24 mV. At ratio 10, the zeta potential of IL22 and AB22 samples continued to decrease towards zero while the potential of the SDBS sample increased towards −50 mV. At ratio 50, the data for IL22 and SDBS was similar to the data at ratio 10. However, the pH and emulsion conductivity was found to be a little lower. The zeta potential for the AB22 sample continued to decrease towards −5 mV and pH increased over a value of 5.

Ratio 0 and 50 emulsions were all liquid-like emulsions that were white with viscosity increasing slightly within the next few hours. At ratio 5 and 10, the IL22 and AB22 samples gelled and flowed in clumps after homogenization while the SDBS sample remained liquid-like with a slight increase in viscosity after a few hours.

Emulsion samples of AB22 were found to have a more uniform distribution of droplets with the exception at ratio 10. At ratio 0 and 5, IL22 with A200 had an almost identical uniform distribution. Also, the droplet distribution of AB22 and SDBS with A200 at ratio 0 and 5 were also identical. At both ratio 10 and 50, IL22 and AB22 followed similar droplet distribution trends. SDBS was found to have a very high content of droplet diameters of less than 5 μm.

Example 3: Gelation Time

The ratio of the nanoparticles to the surface-active agent is an important factor as it controls the zeta potential of the nanoparticles and the time scale of the aggregation process. For zeta potential higher than ±30, the aggregation time scale is extremely long and may be infinite. As the zeta potential get s closer to the zero, the time scale of aggregations decreased significantly and optimally instantaneous at the zero.

FIG. 14 shows the gelation time of IL13, AB13, and NaOleate with Alu C and A-200. As shown, the gelation time can be controlled through these different combinations of formulations. The gelation is varying from instantaneous to 24 hrs. FIG. 15 shows the gelation time of IL22, AB22, and SDBS with Alu C and A-200. The gelation time is even extended to 35 hrs.

This wide range of gelation times may be made use of in different applications when these materials are emplaced in a porous medium, particularly when used in subterranean formations to assist in hydrocarbon recovery techniques. For example, materials with relatively long gelation times may be used post-CHOPS reservoirs to plug the wormholes. While materials with relatively short gelation times may be used for near-wellbore applications, such as water shutoff or acid diversion.

Example 4: Rheology

Rheological analysis is used in this example to illustrate aspects of the internal structure of these complex fluids. In this analysis, the modulus corresponding to the stress component that is in phase with the strain wave is commonly referred to as the storage modulus, is equal to $\tau_0'/\gamma_0$, and is typically denoted G'. The modulus corresponding to the stress component that is 90° out of phase with the strain wave (in phase with the rate of strain wave) is commonly referred to as the loss modulus, is equal to $\tau_0''/\gamma_0$, and is typically denoted G". In this example, first amplitude sweep was conducted for several emulsions. As shown in FIG. 16, for all the emulsions the storage modules is greater than the loss modules, G'>G", indicating that these are solid-like structured systems. The strain overshoot indicates that there are internal structures that rearrange as the shear strain increases but then fail.

It is evident that there is no trend between stability (strength of gel structure)/viscosity and concentrations of IL13 and NPs. The strongest gel was structure was CV75 0.05 wt. % IL13 3 wt. % NPs (also had the highest viscosity). The higher the G', the stronger the structure, and the higher the G", the higher the viscosity of the gel. FIG. 17 shows the flow point of emulsions at 25° C. FIG. 18 presents the frequency Sweep for samples. CV70-CV76 which confirms that these samples are gels at different frequencies.

TABLE 2

Summary of Emulsions Stabilized by [N₄₄₄₄][oleate] IL and Alu C

| | | | | | | | Macroemulsion | |
| Sample | [N$_{4444}$] [oleate] | Alu C NPs (Wt%) | [N$_{4444}$] [oleate] | Alu C NPs (g) | DIW (g) | Sonicator (J) | DIW + NPs + IL (g) | Dodecane (g) |
| --- | --- | --- | --- | --- | --- | --- | --- | --- |
| CV70 | 0.10 | 1.0 | 0.2610 | 0.0431 | 14.6645 | 8607 | 7.5038 | 5.6783 |
| CV71 | 0.01 | 2.0 | 0.5209 | 0.0039 | 14.3739 | 8692 | 7.5124 | 5.6236 |
| CV72 | 0.05 | 2.0 | 0.5200 | 0.0298 | 14.3949 | 8282 | 7.5281 | 5.6240 |
| CV73 | 0.10 | 2.0 | 0.5202 | 0.0523 | 14.3718 | 8649 | 7.5062 | 5.6244 |
| CV74 | 0.01 | 3.0 | 0.7927 | 0.0052 | 14.0778 | 8167 | 7.5198 | 5.6263 |
| CV75 | 0.05 | 3.0 | 0.7901 | 0.0204 | 14.0643 | 8565 | 7.5089 | 5.6520 |
| CV76 | 0.10 | 3.0 | 0.7913 | 0.0417 | 14.1342 | 8165 | 7.5253 | 5.6286 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of emplacing a gel-form material in a porous subterranean formation, comprising:
    admixing solid nanoparticles with an anionic species and a cationic species in an aqueous media to provide a particle-loaded aqueous media having a nanoparticle:ion ratio, wherein the anionic and cationic species are members of an ionic liquid species pair in 1:1 molar ratio;

admixing an organic solvent with the particle-loaded aqueous media so as to produce an initial emulsion having a liquid state; and emplacing the initial emulsion in the porous subterranean formation in the liquid state to form an emplaced emulsion, wherein the emplaced emulsion undergoes a transition to a gel state in situ in the subterranean formation, to form the gel-form material;

wherein the nanoparticle:ion ratio is selected so as to provide a zeta potential greater than zero in the particle-loaded aqueous media and thereby determine a gelation time during which the emplaced emulsion transitions from the liquid state to the gel state.

2. The method of claim 1, wherein the nanoparticle:ion ratio is a weight ratio of the combined anionic and cationic species to the nanoparticles in the particle-loaded aqueous media and the ratio ranges from 1:500 to 500:1.

3. The method of claim 1, wherein the nanoparticles are present in the particle-loaded aqueous media in an amount ranging from 0.001 wt. % to 20 wt. %.

4. The method of claim 1, wherein the absolute concentration of nanoparticles in the gel-form material is 0.1 wt. % to 20 wt. %.

5. The method of claim 1, wherein the subterranean formation comprises a hydrocarbon reservoir.

6. The method of claim 1, wherein the subterranean formation has a porosity of from about 0.1% to 50%.

7. The method of claim 1, wherein the formation has a permeability of from about 1 to about 50000 millidarcys.

8. The method of claim 1, wherein the gel-form material forms a fluid flow barrier in the porous subterranean formation.

9. The method of claim 1, wherein the storage G' modulus of the gel-form material is greater than the loss modulus G" of the gel-form material.

10. The method of claim 1, wherein the ionic liquid species pair, together in isolation, form an ionic liquid at a temperature below 200° C.

11. The method of claim 1, wherein the ionic liquid is tetra-N-butylammonium oleate ($[N4444][oleate]$), tetra-N-butylammonium dodecylbenzene sulfonate ($[N4444][DBS]$), butylammonium oleate ($[C_4NH_3][oleate]$), N-octylammonium oleate ($[C_8NH_3][Oleate]$), tri-ethylammonium oleate ($[HN_{222}][oleate]$), tri-N-butylammonium oleate ($[HN_{444}][oleate]$), tri-N-octylammonium oleate ($[HN_{888}][oleate]$), N-octylammonium dodecylbenzenesulfonate ($[C_8NH_3][DBS]$), butylammonium dodecyl benzenesulfonate, tri-ethylammonium dodecyl benzenesulfonate, tri-N-butylammonium dodecyl benzenesulfonate, or tri-N-octylammonium dodecyl benzenesulfonate.

12. The method of claim 1, wherein the organic solvent has a dielectric constant of less than 15.

13. The method of claim 1, wherein the particle-loaded aqueous media is colloidally stable under stabilized conditions that comprise an average or maximum gravitational force during the stabilized period of 1 gravity and an ambient temperature or a temperature above a freezing point and/or below a boiling point of the media.

14. The method of claim 1, wherein the nanoparticles are comprised substantially of a metal or a metal oxide.

15. The method of claim 14, wherein the metal or metal oxide comprises silicon oxide, iron oxide or aluminum oxide.

16. The method of claim 1, wherein the nanoparticles have an average dimension ranging from 1 nm to 500 nm.

17. The method of claim 1, wherein the particle-loaded aqueous media forms a hydrosol.

18. The method of claim 1, wherein the particle-loaded aqueous media is colloidally stable.

* * * * *